United States Patent [19]

Schlatter

[11] 3,715,912
[45] Feb. 13, 1973

[54] DENSITOMETER
[75] Inventor: Gerald Lance Schlatter, Boulder, Colo.
[73] Assignee: International Telephone and Telegraph Corporation, New York, N.Y.
[22] Filed: April 8, 1971
[21] Appl. No.: 132,493

[52] U.S. Cl. ....................................73/32
[51] Int. Cl. ...............................G01n 9/00
[58] Field of Search............73/30, 32, 67.1, 67.2, 54, 73/59

[56] References Cited

UNITED STATES PATENTS

| | | | |
|---|---|---|---|
| 2,635,462 | 4/1953 | Poole et al. | 73/32 |
| 3,117,440 | 1/1964 | Wilner | 73/32 |
| 3,307,408 | 3/1967 | Thomas et al. | 73/462 |
| 3,426,593 | 2/1969 | Jacobs | 73/32 X |
| 3,444,723 | 5/1969 | Wakefield | 73/32 |

FOREIGN PATENTS OR APPLICATIONS

| | | | |
|---|---|---|---|
| 129,357 | 6/1959 | U.S.S.R. | 73/194 B |

Primary Examiner—Richard C. Queisser
Assistant Examiner—Charles E. Snee, III
Attorney—C. Cornell Remsen, Jr., Walter J. Baum, Paul W. Hemminger, Charles L. Johnson, Jr. and Thomas E. Kristofferson

[57] ABSTRACT

A vibration densitometer having a resonant structure and a tracking filter with a limited tracking band, and an oscillator to add an alternating signal to the filter input of an amplitude less than that supplied thereto at the resonant frequency of the structure when the structure is vibrating. The oscillator output signal has a frequency which is located midway between the upper and lower limits of the tracking band. Without the oscillator the densitometer will not resonate under moderate conditions of pipeline noise. The oscillator provides reliable self-starting. It gives both an amplitude and a frequency boost. The densitometer switches immediately to the resonant frequency after first homing in on the oscillator output signal.

13 Claims, 4 Drawing Figures

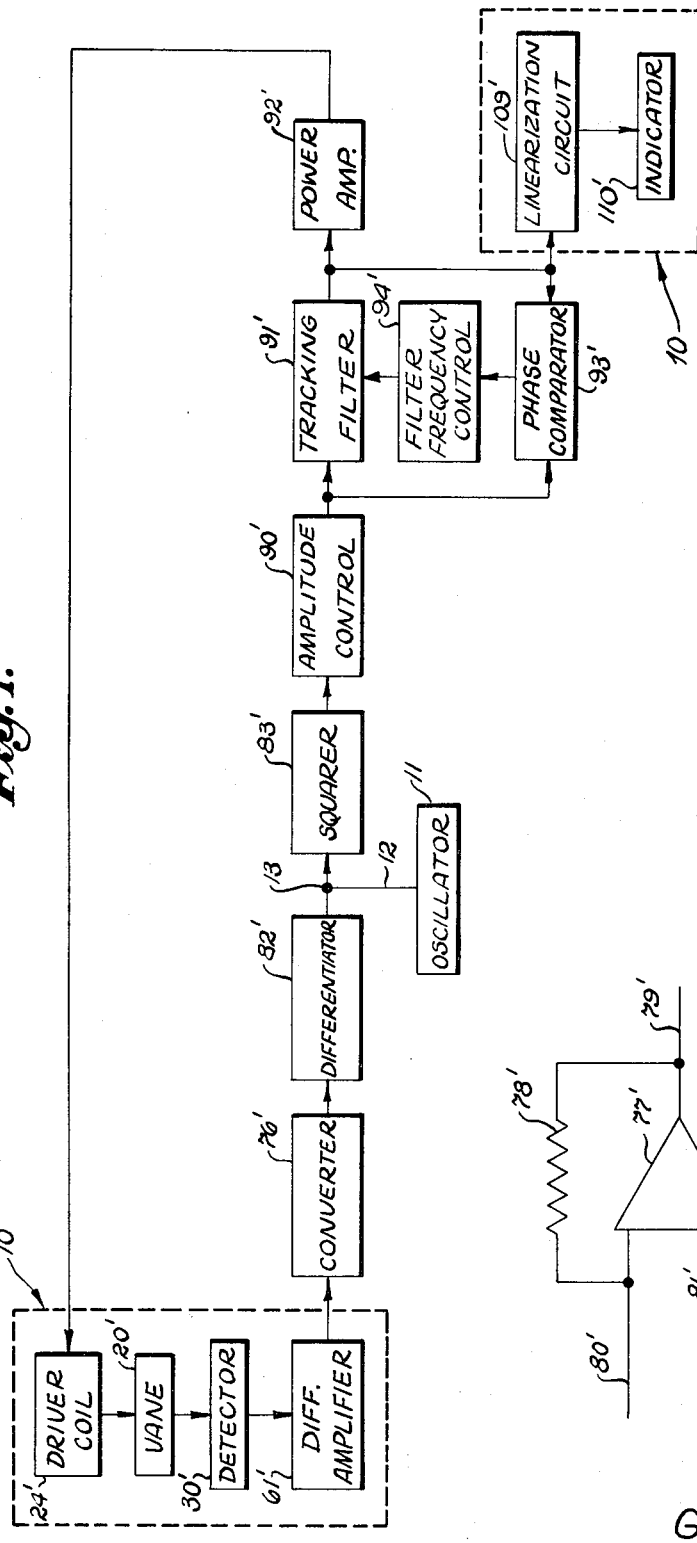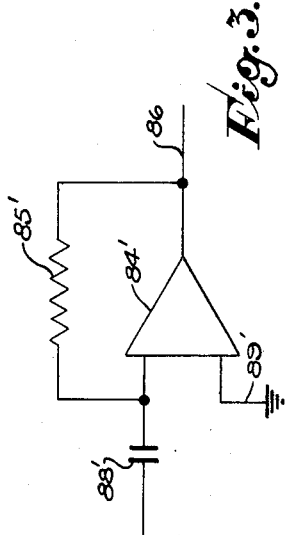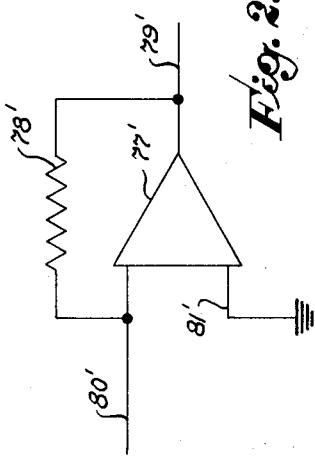

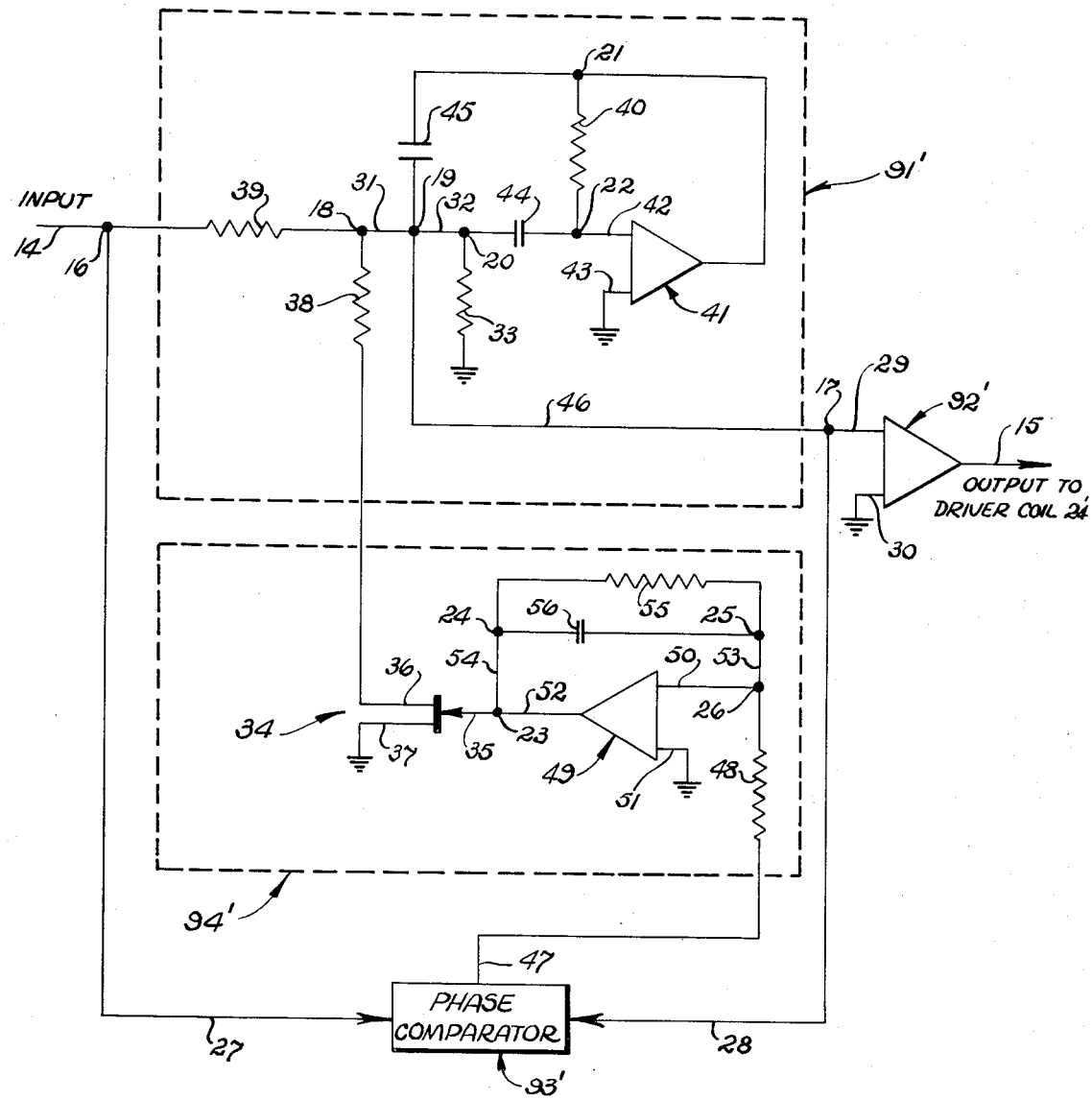
Fig. 4.
INVENTOR.
GERALD L. SCHLATTER
BY
ATTORNEY

DENSITOMETER

BACKGROUND OF THE INVENTION

This invention relates to the art of measuring density, and more particularly to a self-starting vibration densitometer.

It is known that, in a vibration densitometer, if a structure is vibrated at its resonant frequency while being immersed in a fluid, the density of the said fluid can be determined by measuring the said resonant frequency.

The measurement of the density of a fluid flowing in a pipeline is often desirable to obtain total mass flow. This is desirable because the value of petroleum products as fuels is based upon weight rather than volume. Volume changes with other variables including, but not limited to, temperature. Total mass flow may be determined by integrating the product of density and the volume flow rate. The volume flow rate may be determined by a conventional turbine meter or otherwise.

A vibration densitometer, in its entirety, is actually an electromechanical more particularly, with amplified positive feedback. However, it frequently happens that when such a device is employed to produce an electrical analog of the density of a fluid flowing in a pipeline, the pipeline noise will render it impossible for the said electromechanical oscillator to begin oscillating.

SUMMARY OF THE INVENTION

In accordance with the device of the present invention, the above-described and other disadvantages of the prior art are overcome by providing a densitometer including a tracking filter, and an oscillator to introduce its output signal to the tracking filter in addition to the normal feedback.

In accordance with the foregoing, if the electrical output signal magnitude of the oscillator is smaller than that of the resonant frequency when resonance occurs, the filter will first home on the oscillator output signal and then immediately switch to the resonant frequency.

The filter has an upper maximum and a lower minimum tracking frequency. By constructing the oscillator to have an output signal frequency midway between the limits of the upper and lower frequencies, the oscillator frequency is thus as close as possible to all the resonant frequencies within the band between the said upper and lower frequencies.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 1 is a block diagram of a densitometer constructed in accordance with the present invention;

FIG. 2 is a schematic diagram of a current-to-voltage converter shown in FIG. 1;

FIG. 3 is a schematic diagram of a differentiator shown in FIG. 1; and

FIG. 4 is a schematic diagram of two of the blocks shown in FIG. 1, two other of the blocks also being shown in relation thereto.

DESCRIPTION OF THE PREFERRED EMBODIMENT

One embodiment of the densitometer of the present invention is illustrated in FIG. 1. A densitometer probe 10' includes a driver coil 24', a vane 20', a crystal 30' and a differential amplifier 61'. Crystal 30' is labeled "detector."

A current-to-voltage converter 76' is connected from amplifier 61'. Converter 76' is shown in FIG. 2, and may be entirely conventional. In FIG. 2, an amplifier is indicated at 77' having a feedback resistor 78' connected from its output at 79' to its input at 80', amplifier 77' having a ground connection at 81'.

In FIG. 1, a differentiator 82' is connected from converter 76' to a squarer 83'. Differentiator 82' may likewise be entirely conventional, as shown in FIG. 3.

In FIG. 3, an amplifier 84 has a feedback resistor 85' connected from an output 86' to an input 87'. The input to the differentiator 82' is then supplied through a capacitor 88' connected to the amplifier input 87'. Amplifier 84' is also supplied with a ground connection 89'.

The input to differentiator 82' is mainly a sine wave voltage having a frequency which is equal to the resonant frequency detected by crystal 30. A sine wave voltage shifted in phase by 90° from the input sine wave voltage and proportional in amplitude to the absolute value of the input frequency. The output sine wave voltage of the differentiator 82' is then converted to a square wave by squarer 83'.

Since the units of time are not equal to the units of potential, the phrase "square wavet" is, therefore, defined for use herein and in the claims to mean a voltage wave which abruptly arises to a maximum value and stays constant over half the period thereof, and then abruptly drops, for example, with an almost infinite slope again to its minimum value. The square wave then remains at its minimum value for half of its period. Thus, a square wave may have any maximum amplitude and any minimum amplitude without regard to its period or frequency.

An amplitude control 90', a tracking filter 91', and a power amplifier 92' are successively connected from squarer 83' to driver coil 24'. A phase comparator 93' receives one input from the output of control 90', another input from the output of filter 91', and supplies an input to a filter frequency control 94'. The output of the control 94' is employed to vary electrically the frequency location of the pass band of filter 91' to where the signal having the fundamental frequency of the square wave output of control 90' to pass through filter 91' to its output with the least attenuation.

Amplitude control 90' may simply be a voltage divider to reduce the amplitude of the output signal of squarer 83' to a desired value. Note that if all of the blocks of the system of FIG. 1 previously described operate as an electromagnetic oscillator, the oscillation amplitude may increase to infinity at which or before which some of the component parts may fail. Thus, to put a finite limit on the amount of feedback to driver coil 24', control 90' is provided.

Power amplifier 92' produces an alternating output voltage whose average amplitude is somewhat above or below zero. That is, it has a conventional D.C. bias as explained in many publications including, but not limited to, Magnetostriction Transducers, published by the International Nickel Company, Inc. 67 Wall Street, New York, New York 10005. See also, for example, the bibliography of this one publication. The D.C. bias is employed to keep the current flow through driver coil 24' in one direction only and to keep the frequency of the output voltage of crystal 30' equal to that of the input voltage to the driver coil 24'.

In FIG. 1, the output of filter 91' is impressed upon a linearization circuit 109'. The output of circuit 109' is impressed upon an indicator 110', which may be a D.C. voltmeter calibrated in density.

If desired, so that phase comparator 93' may receive a stronger input signal, the output of squarer 83' may be connected to comparator 93', and the input thereto from the output of amplitude control 90' may be omitted. Similarly, the connection between the output of filter 91' and comparator 93' may be omitted and another squarer may be connected from the output of filter 91' to the right hand input of comparator 93'. If the squarer is inserted, the linearization circuit 109' may also receive its output.

In FIG. 1, linearization circuit 109' and indicator 110' may be described as utilization means 10. Utilization means 10 may be that shown in FIG. 1 or may be any other utilization means. Thus, the word "densitometer," as used herein and in the claims, is hereby defined to include any instrument with or without utilization means 10 which is employed to produce an electrical output signal which is an analog signal, the analog signal being a function of the density in which the vibrating structure is immersed. Thus, the work "densitometer" is hereby defined to include an instrument which can be employed to produce an analog output signal. This signal may be employed to produce an indication of density and/or the control of a process in accordance with the density analog, and/or to perform any other function. For example, utilization means 10 may simply be a frequency meter nonlinearly calibrated in density.

In accordance with the present invention, in FIG. 1, an oscillator 11 is provided having an output lead 12 which is connected to the input of squarer 83'.

Oscillator 11 is constructed so as to produce an electrical alternating output signal on lead 12 which is lower in amplitude than the signal of the resonant frequency appearing at the output of differentiator 82' were lead 12 disconnected from a junction 13 to which both the output of differentiator 82' is connected and to which the input of squarer 83' is connected.

Oscillator 11 is also constructed oscillate at a frequency midway between the frequencies of the tracking limits of filter 91', as will be described. That is, the pass band of filter 91' may be moved to track the resonant vibrating frequency of vane 20'. However, there is a lower frequency below which filter 91' cannot track. Further, there is an upper frequency above which filter 91' cannot track. The means to produce these tracking limits will be described hereinafter.

If oscillator 11 is constructed as aforesaid, lead 12 need never be disconnected from junction 13 either before or after vane 20' has begun to vibrate at its resonant frequency.

Block diagrams of amplifier 92' and phase comparator 93' are shown with schematic diagrams of filter 91' and control 94' in FIG. 4.

In FIG. 4, an input lead to the circuit is indicated at 14, and an output from the circuit is indicated at 15. Input lead 14 is connected from the output of control 90', as shown in FIG. 1. Output head 15 is connected to driver coil 24', as shown in FIG. 1.

In FIG. 4, junctions are shown throughout the circuit at 16, 17, 18, 19, 20, 21, 22, 23, 24, 25 and 26.

Phase comparator 93' has first and second input leads 27 and 28 connected from junctions 16 and 17, respectively. Input lead 14 is connected from junction 16. Amplifier 92' has its output connected to lead 15, a first input lead 29 connected from junction 17, and a second input lead 30 which is grounded.

Junctions 18 and 19 are connected together by a conductive lead 31. Junctions 19 and 20 are connected together by a conductive lead 32. A first resistor 33 is connected from junction 20 to ground.

Control 94' includes a field effect transistor 34 which has a gate 35, a drain 36 and a source 37. Source 37 is grounded. A second resistor 38 in filter 91' is connected from junction 18 to transistor drain 36.

A third resistor 39 is connected between junctions 16 and 18. A fourth resistor 40 is connected between junctions 21 and 22.

Filter 91' has an amplifier 41, the output of which is connected to junction 21. Amplifier 41 has a first input lead 42 connected from junction 22, and a second input lead 43 which is grounded. A first capacitor 44 is connected between junctions 20 and 22. A second capacitor 45 is connected between junctions 19 and 21. Junctions 19 and 17 are connected together by a conductive lead 46.

Phase comparator 93' has an output lead 47. A fifth resistor 48 in control 94' is connected from lead 47 to junction 26.

Control 94' includes an amplifier 49 having first and second input leads 50 and 51, respectively, and an output lead 52. Input lead 50 is connected to junction 26. Input lead 51 is grounded. Output lead 52 is connected to junction 23. Gate 35 is also connected to junction 23. A conductive lead 53 connects junctions 25 and 26. A conductive lead 54 connects junctions 24 and 23. A sixth resistor 55 is connected between junctions 24 and 25. Similarly, a third capacitor 56 is connected between junctions 24 and 25.

Control 94' drives the center frequency of the pass band of filter 91' to a point in coincidence with the resonant frequency of vane 20'. Comparator 93' thus produces an output signal to correct the center frequency location of the filter pass band when necessary. This correction is made through amplifier 49 which changes the resistance between the drain 36 and the source 37 of transistor 34.

Resistors 33 and 38 determine the tracking limits of filter 91', as described previously In particular, when the resistance between drain 36 and source 37 is infinitely for all practical purposes, the resistance of resistor 33 determines the lowest frequency at which the pass band of filter 91' may be located.

Transistor 34 may be a minimum drain to source resistance typically of about 30 ohms. Thus, the resistance of resistor 38 plus the minimum resistance between drain 36 and source 37 in parallel with the resistance of resistor 33 determines the maximum frequency at which the pass band of filter 91' may be located. The maximum frequency is, of course, greater than the minimum frequency.

For design purposes, either or both or neither of resistors 33 and 38 may be variable. In the design, the desired resistance of resistor 33 for a particular lower frequency limit is calculated first. Then, the resistance of resistor 38 is calculated knowing the minimum drain to source resistance of transistor 34.

Alternatively, if resistors 33 and 38 are variable, the resistances thereof may be set by the use of test equipment, the resistance of resistor 33 being set first, and the resistance of resistor 38 being set second.

In FIG. 1, coil 24' may be located about a magnetostrictive member to vibrate vane 20', if desired.

Detector 30' may be a piezoelectric crystal.

With output lead 12 of oscillator 11 disconnected from junction 13 in FIG. 1, all of the structure shown in FIG. 1, except tracking filter 91', may be identical to that disclosed in copending application Ser. No. 65,371, filed Aug. 20, 1970, C. E. Miller and G. L. Schlatter for DENSITOMETER, now U.S. Pat. No. 3,677,067.

By this reference hereto, said copending application, in its entirety, is incorporated herein as though fully set forth herein hereat. The same is true of copending application Ser. No. 123,254, filed on Mar. 11, 1971, by C. E. Miller for DENSITOMETER, referred to herein as C. E. Miller 4; and copending application Ser. No. 124,070, filed on Mar. 15, 1971, by G. L. Schlatter for FUNCTION GENERATOR AND COMPONENTS THEREOF, referred to herein as G. L. Schlatter 2.

OPERATION

In the operation of the densitometer of the present invention shown in FIG. 1, probe 10° is sealed through an opening in a pipeline which carries a flowing fluid. Probe 10' is thus immersed in the fluid, and the vane 20' is driven to vibrate at a frequency in accordance with the fluid density.

When power is supplied, even with moderate pipeline noise and vibration, with oscillator lead 12 disconnected from junction 13, vane 20' will not vibrate at a detectable resonant frequency. This problem is overcome by connecting lead 12 to junction 13, for example, permanently at the factory. In this case, as soon as electrical power is supplied to the circuits of FIG. 1, oscillator 11 will add its output signal to the output signal of differentiator 82'. The outputs of both oscillator 11 and differentiator 82' will thus be impressed upon squarer 83'. Thus combined signals will then be passed through squarer 83' and amplitude control 90' to the inputs of filter 91' and phase comparator 93'.

Since phase comparator 93' obtains an input from the output of filter 91', it will, through control 94', control the location of the pass band of filter 91' so that it follows the output signal frequency of oscillator 11, i.e., midway between the frequency limits of tracking filter 91'.

The time required for amplitude build-up and mid location of the filter pass band is of no consequence. That is, the transient response of the comparator 93', control 94' and filter 91' and the regeneration caused by oscillation of vane 20' briefly at the oscillator frequency by amplifier 92' is so fast as to be of no consequence. Further, once vibration amplitude build-up occurs, the transient response of the shift of the frequency of vane 20' from the frequency of oscillator 11 to its natural resonant frequency is so fast as to be of no consequence.

As stated previously, the densitometer of FIG. 1 may be considered to be an electromechanical oscillator. Its general function, as such, perhaps need be briefly described in understanding the aforementioned regeneration.

Note will be taken that detector 30' produces an alternating signal which is of a frequency the same as that at which vane 20' vibrates. In effect, this signal is derived from the output of filter 91' and amplifier 92' so that coil 24', in fact, drives vane 20' at the same frequency it's already vibrating. Note that from driver coil 24' through vane 20', detector 30', amplifier 61', etc., to power amplifier 92' and back to driver coil 24' is a closed loop. Thus, if the gain of the loop is adequate, vibrations can be sustained at the natural resonant frequency of vane 20'. Further, even though vane 20' may be rigidly held, and even though vane 20' may, by its mounting, have a high degree of damping, if the loop gain is greater than the damping, sustained vibration of vane 20' may be achieved.

One feature of the invention resides in the use of an oscillator output signal which has an amplitude less than the amplitude of the output signal of differentiator 82' which is at the natural resonant frequency of vane 20' when vane 20' is vibrating at its natural resonant frequency. It is thus unnecessary to disconnect oscillator 11 after it has performed its starting function.

Another feature of the invention resides in the use of the oscillator frequency midway between the tracking limits of filter 91'. This makes it possible for the oscillator frequency to be as close as possible to all frequencies lying between the said filter limits.

The feature of the invention relating to oscillator output signal amplitude may be described in another way. That is, the output signal amplitude of oscillator 11 is less than the amplitude of the output signal of differentiator 82' which is of a natural resonant frequency, $f$, at which vane 20' oscillates, i.e. when it does, in fact, oscillate at its natural resonant frequency.

In this case, $f$ is given by $$f = \sqrt{A/d - B}$$

where,
  $d$ is the density of the fluid in which probe 10' is immersed,
  $A$ is a constant, and
  $B$ is a constant.

What is claimed is:

1. A vibration densitometer comprising: a probe having a structure adapted to be vibrated at its resonant frequency; first means actuable to vibrate said structure; second means to produce an alternating output signal at the output thereof a frequency the same as that at which said structure is vibrating; a tracking filter having a signal input, a signal output and a control input; third means connecting the output of said second means to the signal input of said tracking filter; an oscillator having an output connected to said third means in a manner to add an auxiliary alternating electrical input signal to said tracking filter input in addition to that supplied by said third means responsive to said second means output signal; a phase comparator having first and second inputs and an output; a control for said tracking filter connected from said comparator output to said tracking filter control input to vary the location of the pass band of said filter in accordance with the magnitude of the signal appearing at said comparator output, said tracking filter signal input and signal output being connected to said comparator first and second inputs, respectively; and fourth means connected from said tracking filter signal output to said first means to actuate said first means to vibrate said structure at the frequency of the signal appearing at the signal output of said tracking filter.

2. The invention as defined in claim 1, including utilization means connected from said tracking filter signal output.

3. The invention as defined in claim 1, wherein said third means includes a differentiator and a squarer connected in that order from said second means to the signal input of said tracking filter, said squarer having an input and an output, said differentiator having an output connected to said squarer input, said oscillator also having its output connected to said squarer input.

4. The invention as defined in claim 3, wherein said tracking filter includes fifth and sixth means to provide a lower and higher limits, respectively, to the excursion of said pass band thereof, said oscillator being constructed to have an output signal frequency equal to that midway between said limits, said oscillator being constructed to have an output signal amplitude less than that of the output signal of said differentiator when said oscillator output is disconnected from said squarer input and said structure is immersed in a fluid and vibrated at a resonant frequency, $f$, given by $$f = \sqrt{A/d - B}$$

where,
$d$ is the density of said fluid,
$A$ is a constant, and
$B$ is a constant,
said fifth and sixth means including first and second resistors, respectively, said tracking filter including a center junction, first and second capacitors, third and fourth resistors and a first amplifier having first and second inputs and an output, said first amplifier input being grounded, said third resistor being connected from said squarer output to said center junction, said second capacitor being connected from said center junction to said first amplifier first input, said fourth resistor being connected from said first amplifier output to said first amplifier first input, said first capacitor being connected from said first amplifier output to said center junction, said fourth means being connected from said center junction, said first resistor being connected from said center junction to ground, said filter frequency control including a second amplifier, fifth and sixth resistors, a third capacitor, a field effect transistor having a source, a drain and a gate, said second amplifier having first and second inputs and an output, said second amplifier second input being grounded, said fifth resistor being connected from said comparator output to said second amplifier first input, said second resistor being connected from said center junction to said transistor drain, said sixth resistor being connected from said second amplifier output to said second amplifier first input, said third capacitor being connected in parallel with said sixth resistor, said second amplifier output being connected to said transistor gate, said transistor source being grounded, said third resistor being connected from said center junction to said first comparator input, said second comparator input being connected from said center junction.

5. The invention as defined in claim 3, wherein said tracking filter includes means to prevent movement of the pass band thereof beyond upper and lower limiting frequencies, said oscillator having an output signal frequency midway between said limiting frequencies.

6. The invention as defined in claim 3, wherein said oscillator has an output signal amplitude less than that of a predetermined frequency having the greatest amplitude appearing at the output of said differentiator when said structure is vibrating at its resonant frequency 7. The invention as defined in claim 6, wherein said tracking filter includes means to prevent movement of the pass band thereof beyond upper and lower limiting frequencies, said oscillator having an output signal frequency midway between said limiting frequencies.

8. The invention as defined in claim 1, wherein said tracking filter includes means to prevent movement of the pass band thereof beyond upper and lower limiting frequencies, said oscillator having an output signal frequency midway between said limiting frequencies.

9. The invention as defined in claim 8, wherein said oscillator introduces a signal to said tracking filter of an amplitude less than that of the signal introduced thereto of the resonant frequency of said structure when said structure in vibrating at said resonant frequency.

10. The invention as defined in claim 1, wherein said oscillator introduces a signal to said tracking filter of an amplitude less than that of the signal introduced thereto of the resonant frequency of said structure when said structure is vibrating at said resonant frequency.

11. The invention as defined in claim 1, wherein said tracking filter has means to prevent the pass band thereof from falling below a predetermined frequency, said oscillator having an output signal frequency greater than said predetermined frequency.

12. The invention as defined in claim 1, wherein said tracking filter has means to prevent the pass band thereof from rising above a predetermined frequency, said oscillator having an output signal frequency less than said predetermined frequency.

13. The invention as defined in claim 1, wherein said tracking filter includes means to prevent the pass band thereof from falling below a first predetermined frequency or rising above a second different predetermined frequency higher than said first, said oscillator having an output signal frequency higher than said first frequency and lower than said second frequency.

* * * * *